(12) United States Patent  
Fushimi

(10) Patent No.: US 8,674,812 B2  
(45) Date of Patent: Mar. 18, 2014

(54) METHOD OF CONTROLLING COMMUNICATION

(75) Inventor: Takahiro Fushimi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 178 days.

(21) Appl. No.: 13/220,561

(22) Filed: Aug. 29, 2011

(65) Prior Publication Data

US 2012/0056724 A1    Mar. 8, 2012

(30) Foreign Application Priority Data

Sep. 2, 2010    (JP) ................................. 2010-196664

(51) Int. Cl.
```
H04Q 5/22     (2006.01)
H03C 5/00     (2006.01)
H03C 3/00     (2006.01)
H03D 1/24     (2006.01)
H04B 1/02     (2006.01)
```

(52) U.S. Cl.  
USPC ........ 340/10.51; 375/269; 375/303; 375/320; 455/108

(58) Field of Classification Search  
USPC ........ 340/10.1–10.5; 375/268–270, 303, 320, 375/334, 315; 455/108, 109  
See application file for complete search history.

(56) References Cited

U.S. PATENT DOCUMENTS

| | | | |
|---|---|---|---|
| 2002/0173312 A1* | 11/2002 | Takano et al. | 455/452 |
| 2005/0101249 A1* | 5/2005 | Sipola | 455/39 |
| 2006/0082445 A1* | 4/2006 | O'Toole et al. | 340/10.4 |
| 2008/0001825 A1 | 1/2008 | Sunagawa et al. | |
| 2009/0243857 A1 | 10/2009 | Kurokawa et al. | |

FOREIGN PATENT DOCUMENTS

| | | |
|---|---|---|
| JP | 07-200749 A | 8/1995 |
| JP | 2008-033905 A | 2/2008 |
| JP | 2009-243599 A | 10/2009 |

\* cited by examiner

*Primary Examiner* — Steven Lim  
*Assistant Examiner* — Omeed Alizada  
(74) *Attorney, Agent, or Firm* — Studebaker & Brackett PC

(57) ABSTRACT

In a communication system including a RFID tag, which has a function to record information and a function to carry out wireless communication with an external device and is capable of transmission with using both FM modulation and AM modulation, and a reader/writer for writing and reading information onto and from the RFID tag via wireless communication, a transmission to transmit information from the RFID tag to the reader/writer is carried out with using one of the FM modulation and the AM modulation at the RFID tag. If the reader/writer fails to decode a signal transmitted with using the one of the FM modulation and the AM modulation, transmission with respect to the information is carried out with using the other of the FM modulation and the AM modulation at the RFID tag. In this manner, reading error of data sent from the RFID tag is prevented.

2 Claims, 17 Drawing Sheets

FIG.4
1. RECEIVED DATA ON DUAL SUBCARRIER (DECODABLE)
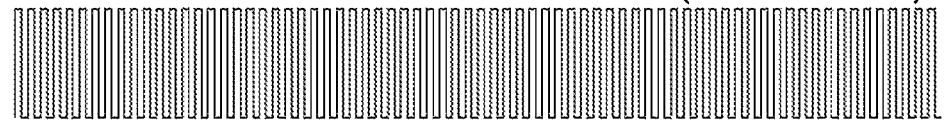
2. RECEIVED DATA ON SINGLE SUBCARRIER (DECODABLE)
3. RECEIVED DATA ON DUAL SUBCARRIER (UNDECODABLE)
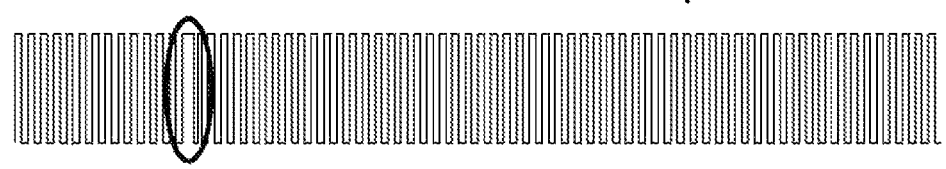
4. RECEIVED DATA ON SINGLE SUBCARRIER (UNDECODABLE)
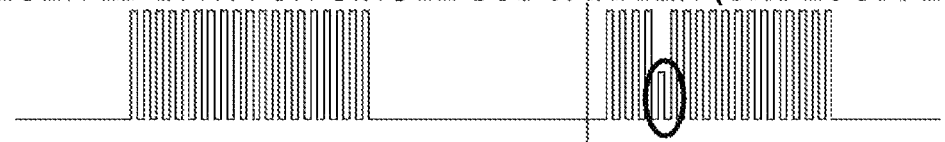
5.  |   1   |   0   |   1   |   0   |

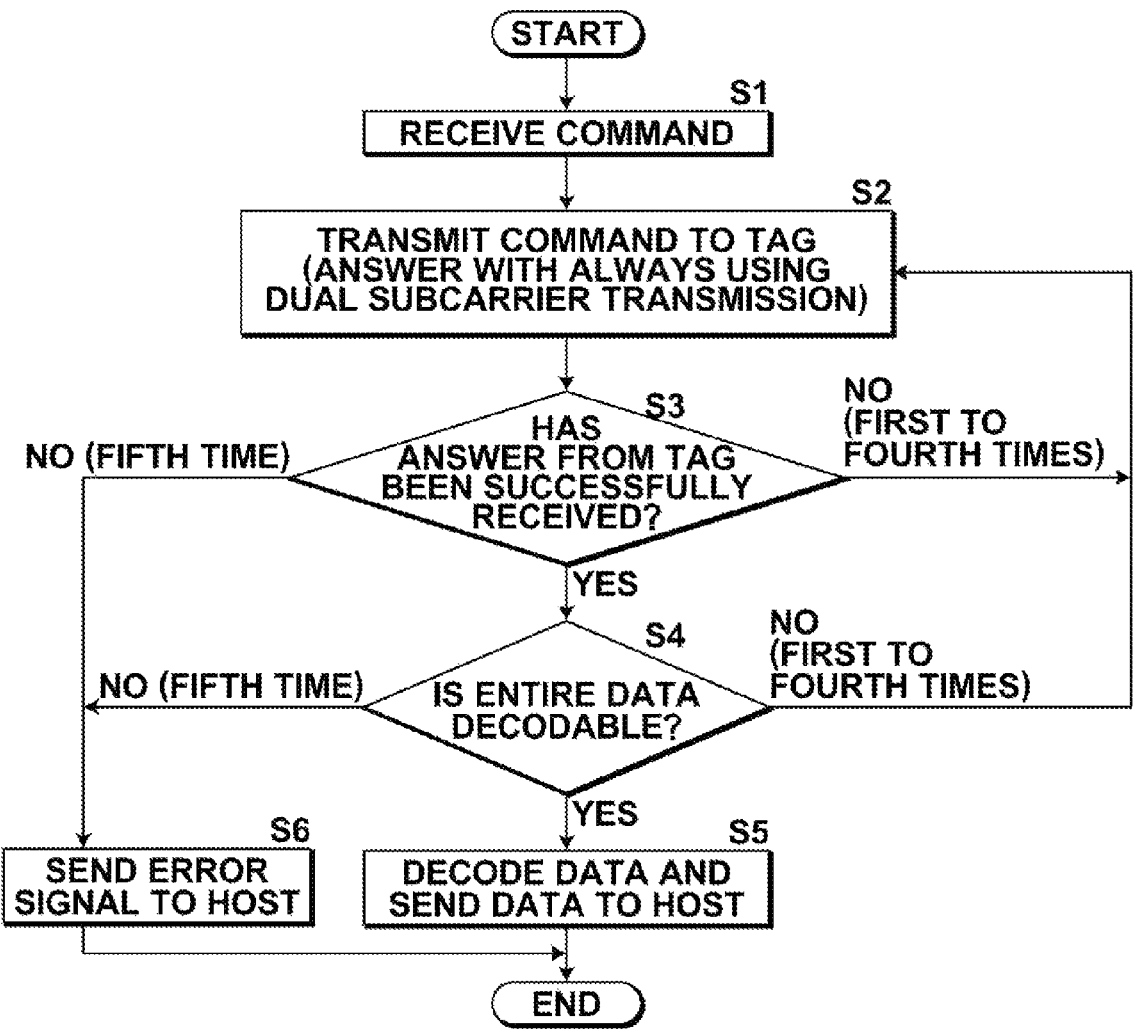

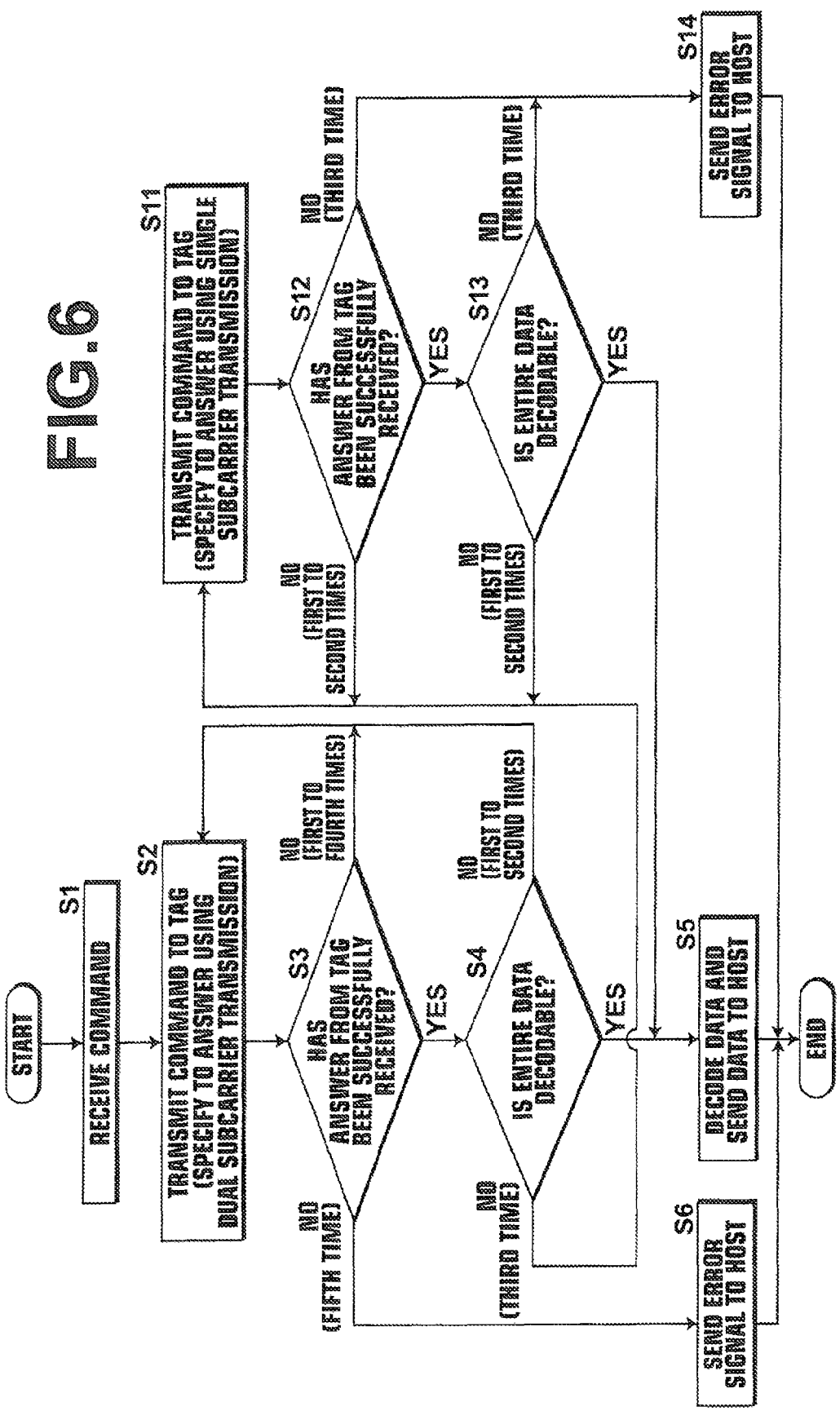

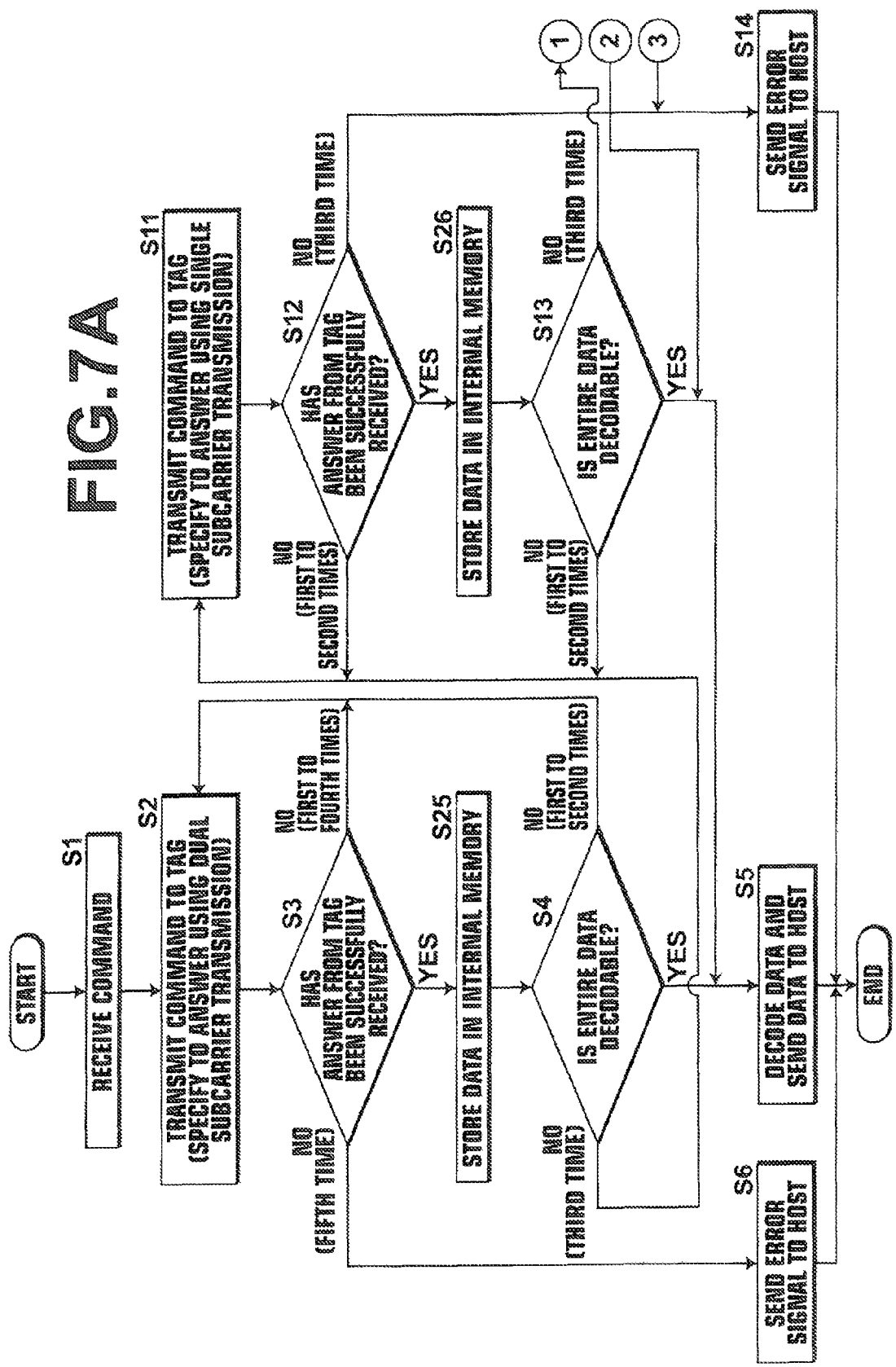

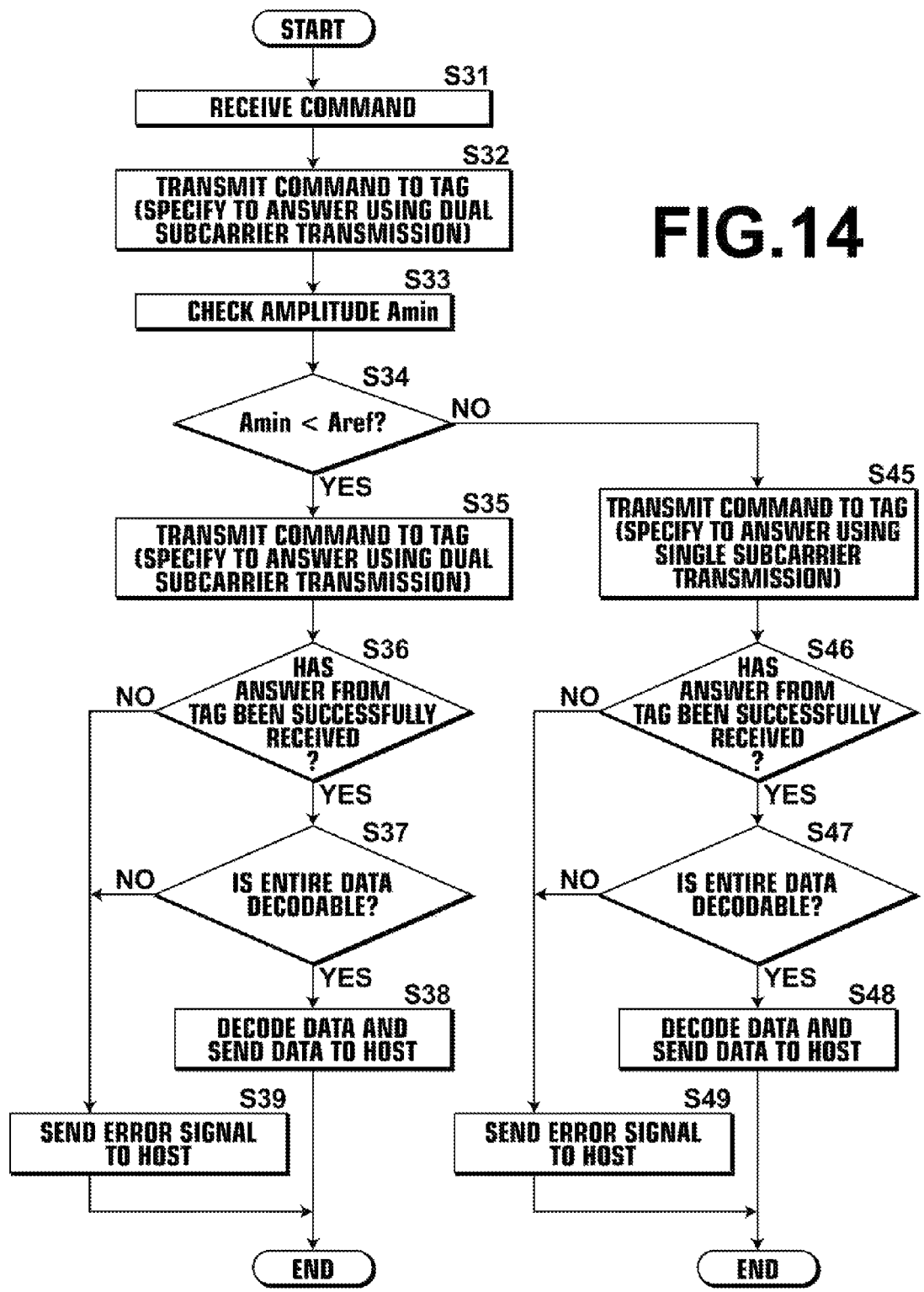

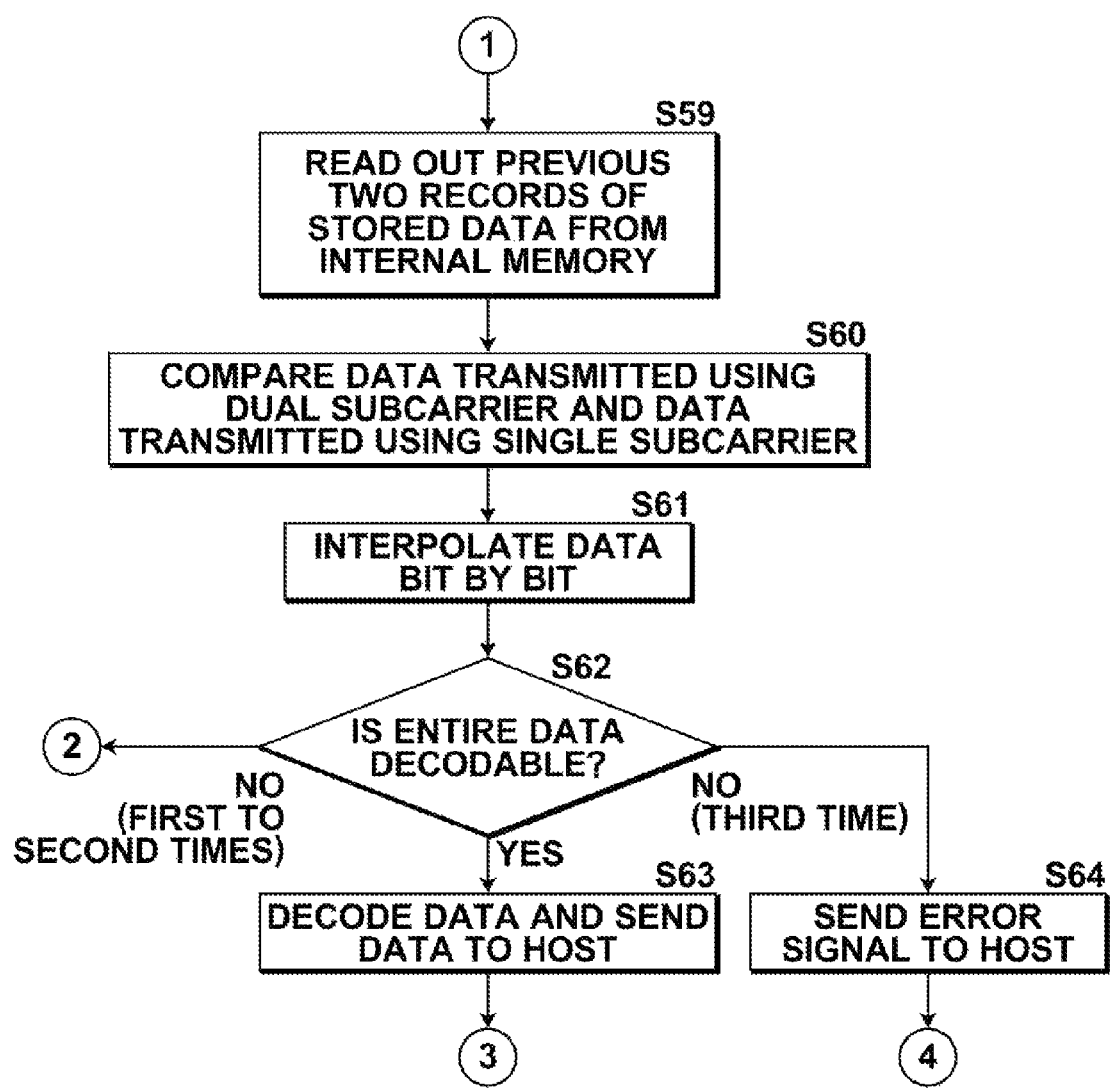

METHOD OF CONTROLLING COMMUNICATION

BACKGROUND OF THE INVENTION

1. Field of the Invention

The present invention relates to a method of controlling communication, and particularly to a method of controlling communication in a communication system including a RFID tag and a reader/writer, which writes and reads information onto and from the RFID tag via wireless communication.

2. Description of the Related Art

As disclosed, for example, in Japanese Unexamined Patent Publication Nos. 7 (1995)-200749 (hereinafter, Patent Document 1) and 2008-033905 (hereinafter, Patent Document 2), a communication system including a RFID tag having a function to record information and a function to carry out wireless communication with respect to the information with an external device, and a reader/writer, which writes and reads information onto and from the RFID tag via wireless communication, has been known. Recently, this type of communication systems have been widely applied to automatic ticket gate systems at stations, merchandise management systems, etc. Further, as disclosed, for example, in Japanese Unexamined Patent Publication No. 2009-234599 (hereinafter, Patent Document 3), this type of communication systems are being applied to management of parts forming various devices and consumable supplies.

The communication systems including the RFID tag and the reader/writer generally use, as the communication method, FM modulation and/or AM modulation. For example, according to the ISO 15693-2 standard, which specifies a standard for this types of communication systems, both the FM modulation and the AM modulation are usable for transmission from the RFID tag to the reader/writer.

According to this standard, the FM modulation uses a combination of eight subcarrier pulses with a frequency of 423.75 kHz and nine subcarrier pulses with a frequency of 484.28 kHz to represent one bit That is, when these subcarriers are sent in this order, they represent "0", and when these subcarriers are sent in reverse order, they represent "1". In general, these subcarriers are referred to as a dual subcarrier.

On the other hand, the AM modulation uses a combination of a state when a pulsed subcarrier with a constant frequency rises in a predetermined period and a state when the pulsed subcarrier does not rise in the predetermined period to represent one bit That is, when these states are set in this order, they represent "0", and when these states are set in reverse order, they represent "1". In general, this subcarrier with a constant frequency is referred to as a single subcarrier.

In the communication systems using the RFID tag as described above, it is very difficult to completely prevent occurrence of an error in communication from the RFID tag to the reader/writer. Conventionally, in order to minimize occurrence of such a communication error, it is considered to carry out optimization of the modulation method and/or signal cancelling at the RFID tag to stabilize communication. However, at the reader/writer, transmission/reception with the RFID tag is simply controlled and the received signal is decoded without any additional processing. Therefore, even if an answer signal from the RFID tag has been sent back, an error may occur during decoding, resulting in unsuccessful reading of the data sent from the RFID tag.

SUMMARY OF THE INVENTION

In view of the above-described circumstances, the present invention is directed to providing a method of controlling communication, which can minimize, in a communication system including a RFID tag and a reader/writer, reading error of data sent from the RFID tag.

A first aspect of the method of controlling communication according to the invention is for use with a communication system including a RFID tag having a function to record information and a function to carry out wireless communication with an external device, and a reader/writer for writing and reading information onto and from the RFID tag via wireless communication, the RFID tag being capable of transmission with using both FM modulation and AM modulation, as described above, the method including:

when information is transmitted from the RFID tag to the reader/writer, carrying out the transmission with using one of the FM modulation and the AM modulation at the RFID tag; and if the reader/writer fails to decode a signal transmitted with using the one of the FM modulation and the AM modulation, carrying out transmission with respect to the information with using the other of the FM modulation and the AM modulation at the RFID tag.

A second aspect of the method of controlling communication according to the invention is for use with a communication system including the RFID and the reader/writer as described above, the RFID tag being capable of transmission with using both FM modulation and AM modulation, the method including:

prior to transmitting information from the RFID tag to the reader/writer, carrying out test transmission with using the FM modulation or the AM modulation at the RFID tag; and if a minimum amplitude of a signal received by the reader/writer at this time is smaller than a predetermined threshold, carrying out transmission with respect to the information with using the FM modulation at the RFID tag, and if the minimum amplitude is equal to or larger than the threshold, carrying out transmission with respect to the information with using the AM modulation at the RFID tag.

A third aspect of the method of controlling communication according to the invention is for use with a communication system including the RFID and the reader/writer as described above, the RFID tag being capable of transmission with using both FM modulation and AM modulation, the method including:

when information is transmitted from the RFID tag to the reader/writer, carrying out both of transmission using the FM modulation at the RFID tag and transmission using the AM modulation at the RFID tag; and interpolating a part undecodable by the reader/writer of a signal transmitted with using one of the FM modulation and the AM modulation and received by the reader/writer with a signal transmitted with using the other of the FM modulation and the AM modulation and received by the reader/writer, and then, decoding the signals.

It should be noted that the third aspect of the method of controlling communication may be carried out independently or may be carried out in combination with the first aspect of the method of controlling communication, such that if an error occurs with the first aspect of the method of controlling communication, subsequently, the third aspect of the method of controlling communication may be carried out.

In a fourth aspect of the method of controlling communication according to the invention, the first aspect of the method of controlling communication and the third aspect of the method of controlling communication are carried out in combination, as described above. Specifically, the fourth aspect of the method of controlling communication is for use with a communication system including the RFID and the reader/writer as described above, the RFID tag being capable of transmission with using both FM modulation and AM modulation, the method including:

when information is transmitted from the RFID tag to the reader/writer, carrying out the transmission with using one of the FM modulation and the AM modulation at the RFID tag;

if the reader/writer fails to decode a signal transmitted with using the one of the FM modulation and the AM modulation, carrying out transmission with respect to the information with using the other of the FM modulation and the AM modulation at the RFID tag; and if the reader/writer fails to decode a signal transmitted with using the other of the FM modulation and the AM modulation, interpolating a part undecodable by the reader/writer of the signal transmitted with using one of the FM modulation and the AM modulation and received by the reader/writer with the signal transmitted with using the other of the FM modulation and the AM modulation and received by the reader/writer, and then, decoding the signals.

A fifth aspect of the method of controlling communication according to the invention is for use with a communication system including the RED and the reader/writer as described above, the RED tag being capable of transmission with using both FM modulation and AM modulation, the method including:

when information is transmitted from the RFID tag to the reader/writer, carrying out both of transmission using the FM modulation at the RED tag and transmission using the AM modulation at the RED tag; and interpolating a part undecodable by the reader/writer of a signal transmitted with using one of the FM modulation and the AM modulation and received and decoded by the reader/writer with a corresponding part of a signal transmitted with using the other of the FM modulation and the AM modulation and received and decoded by the reader/writer.

It should be noted that the fifth aspect of the method of controlling communication may be carried out independently, or may be carried out in combination with the first aspect of the method of controlling communication, such that, if an error occurs with the first aspect of the method of controlling communication, subsequently, the fifth aspect of the method of controlling communication may be carried out.

In a sixth aspect of the method of controlling communication according to the invention, the first aspect of the method of controlling communication and the fifth aspect of the method of controlling communication are carried out in combination, as described above. Specifically, the sixth aspect of the method of controlling communication is for use with a communication system including the RFID and the reader/writer as described above, the RFID tag being capable of transmission with using both FM modulation and AM modulation, as described above, the method including:

when information is transmitted from the RFID tag to the reader/writer, carrying out the transmission with using one of the FM modulation and the AM modulation at the RFID tag;

if the reader/writer fails to decode a signal transmitted with using the one of the FM modulation and the AM modulation, carrying out transmission with respect to the information with using the other of the FM modulation and the AM modulation at the RFID tag; and if the reader/writer fails to decode a signal transmitted with using the other of the FM modulation and the AM modulation, interpolating a part undecodable by the reader/writer of the signal transmitted with using one of the FM modulation and the AM modulation and received and decoded by the reader/writer with the signal transmitted with using the other of the FM modulation and the AM modulation and received and decoded by the reader/writer.

According to study by the present inventor, the major factor of reading error during reading the data from the RED tag in the conventional communication system including the RFID tag and the reader/writer is found to be as follows.

In the FM modulation using a dual subcarrier, the reader/writer carries out decoding based on the cycle of the subcarrier, and therefore the FM modulation is advantageous in long distance communication. However, in short distance communication, the cycle of the answer signal from the RFID tag is disturbed, and this often results in an error during decoding. The disturbance of the cycle of the answer signal from the RFID tag is attributed to the fact that, if the transmission power of the reader/writer is kept at a constant value for achieving stable long-distance communication, the transmission power is excessively large for short-distance communication. In contrast, in the AM modulation using a single subcarrier, the reader/writer carries out decoding based on the amplitude of the subcarrier, and therefore the AM modulation is advantageous in short distance communication. However, if the communication distance is longer, the amplitude of the answer signal from the RFID tag becomes smaller, and this often results in an error during decoding.

As described previously, in the case where a conventional communication system conforms to the ISO 15693-2 standard, etc., the system can use both the FM modulation and the AM modulation for transmission from the RFID tag to the reader/writer. However, when the system is actually run, one of the FM modulation and the AM modulation is selected to be used. Therefore, if the former is selected, errors often occur during short-distance communication, and if the latter is selected, errors often occur during long-distance communication due to the above-described characteristics of the FM modulation and the AM modulation.

Based on the above-described knowledge, the first aspect of the method of controlling communication according to the invention involves, when information is transmitted from the RFID tag to the reader/writer, carrying out the transmission with using one of the FM modulation and the AM modulation at the RFID tag, and if the reader/writer fails to decode the signal transmitted using the one of the FM modulation and the AM modulation, carrying out transmission with respect to the information with using the other of the FM modulation and the AM modulation at the RFID tag. Thus, transmission can be carried out with using the AM modulation during the short-distance communication, where the FM modulation often results in reading error, and using the FM modulation during the long-distance communication, when the AM modulation often results in reading error, thereby minimizing occurrence of reading error.

Further, based on the above-described knowledge, the second aspect of the method of controlling communication according to the invention involves, prior to transmitting information from the RFID tag to the reader/writer, carrying out test transmission with using the FM modulation or the AM modulation at the RFID tag, and then, if a minimum amplitude of a signal received by the reader/writer at this time is smaller than a predetermined threshold (in this case, it is highly likely that long-distance communication is carried out), carrying out transmission with respect to the information with using the FM modulation at the RFID tag, and if the minimum amplitude is equal to or larger than the threshold (in this case, it is highly likely that short-distance communication is carried out), carrying out transmission with respect to the information with using the AM modulation at the RFID tag. Thus, transmission can be carried out with using the FM modulation during the long-distance communication, and using the AM modulation during the short-distance communication, thereby minimizing occurrence of reading error.

Still further, based on the above-described knowledge, the third aspect of the method of controlling communication according to the invention involves, when information is transmitted from the RFID tag to the reader/writer, carrying out both of transmission using the FM modulation at the RFID tag and transmission using the AM modulation at the RFID tag, and interpolating a part undecodable by the reader/writer of a signal transmitted with using one of the FM modulation and the AM modulation and received by the reader/writer with a signal transmitted with using the other of the FM modulation and the AM modulation and received by the reader/writer, and then, decoding the signals. Thus, decoded data with minimized reading error can finally be provided.

The fourth aspect of the method of controlling communication according to the invention carries out the third aspect of the method of controlling communication in combination with the first aspect of the method of controlling communication, as described above. According to the fourth aspect of the method of controlling communication, even when a reading error still occurs after the first aspect of the method of controlling communication has been carried out, decoded data with minimized reading error can be provided.

Still further, based on the above-described knowledge, the fifth aspect of the method of controlling communication according to the invention involves, when information is transmitted from the RFID tag to the reader/writer, carrying out both of transmission using the FM modulation at the RFID tag and transmission using the AM modulation at the RFID tag, and interpolating a part undecodable by the reader/writer of a signal transmitted with using one of the FM modulation and the AM modulation and received and decoded by the reader/writer with a corresponding part of a signal transmitted with using the other of the FM modulation and the AM modulation and received and decoded by the reader/writer. Thus, decoded data with minimized reading error can finally be provided.

The sixth aspect of the method of controlling communication according to the invention carries out the fifth aspect of the method of controlling communication in combination with the first method of controlling communication, as described above. According to the sixth aspect of the method of controlling communication, even when a reading error still occurs after the first aspect of the method of controlling communication has been carried out; decoded data with minimized reading error can be provided.

BRIEF DESCRIPTION OF THE DRAWINGS

FIG. 4 is a graph showing states of subcarriers and data transmitted by the subcarriers in the communication system, FIG. 5 is a flow chart illustrating the flow of a process in one example of a conventional method of controlling communication, FIG. 6 is a flow chart illustrating the flow of a process in the method of controlling communication according to a first embodiment of the invention, FIG. 7A is a flow chart illustrating the flow of a process in the method of controlling communication according to a second embodiment of the invention, FIG. 14 is a flow chart illustrating the flow of a process in the method of controlling communication according to a third embodiment of the invention, FIG. 15B is a flow chart illustrating the flow of the process in the method of controlling communication according to the fourth embodiment of the invention.

DESCRIPTION OF THE PREFERRED EMBODIMENTS

Figure 1:
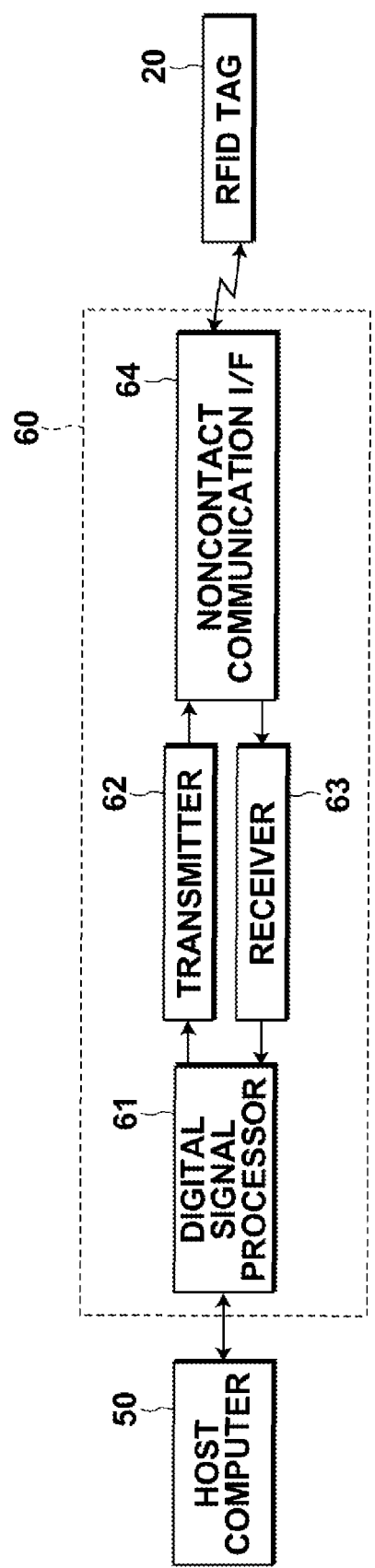
FIG. 1 is block diagram illustrating one example of a communication system which carries out a method of the present invention.
Figure 2:
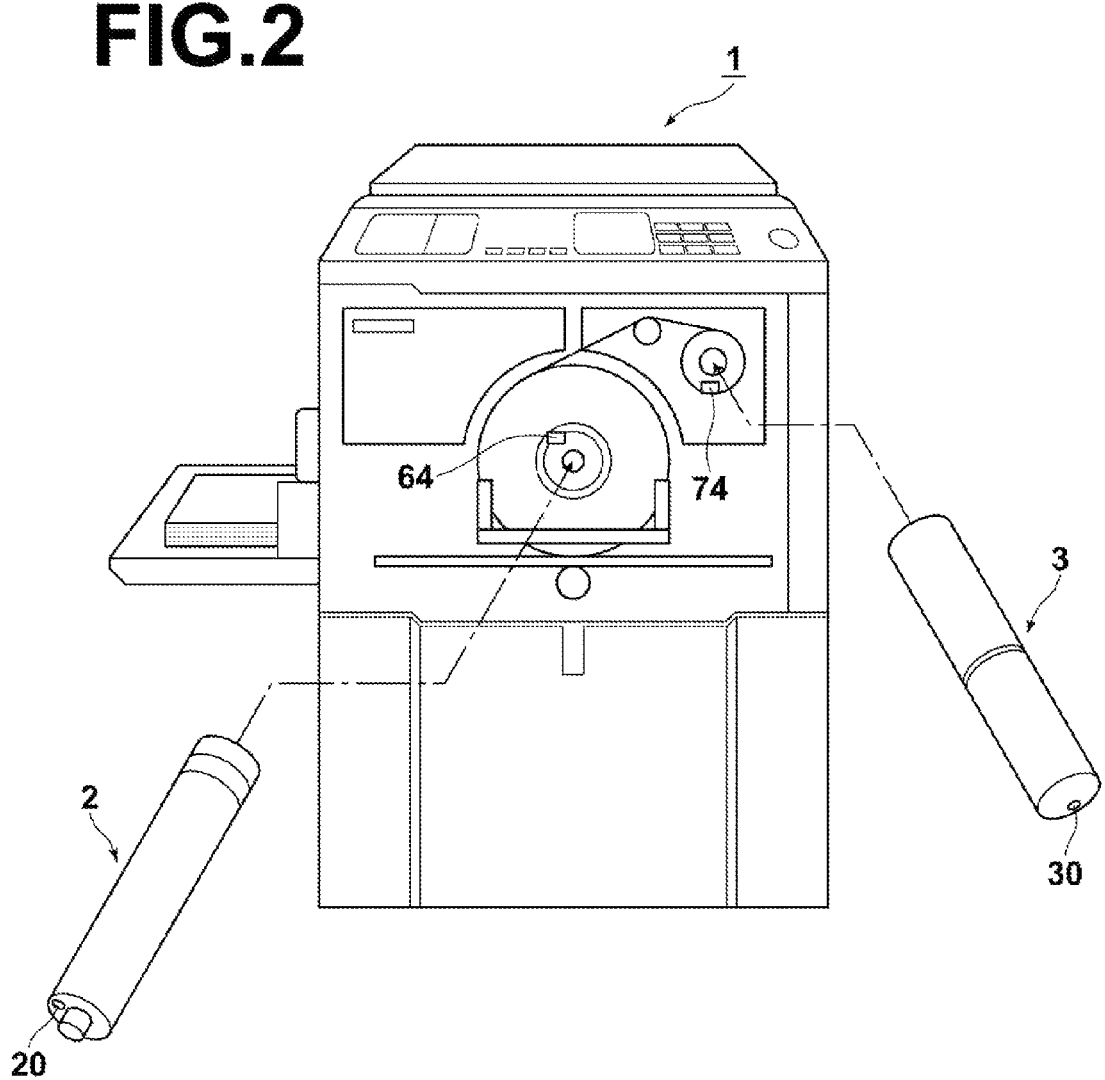
FIG. 2 is a perspective view illustrating a screen printing apparatus which uses the communication system.
Figure 3:
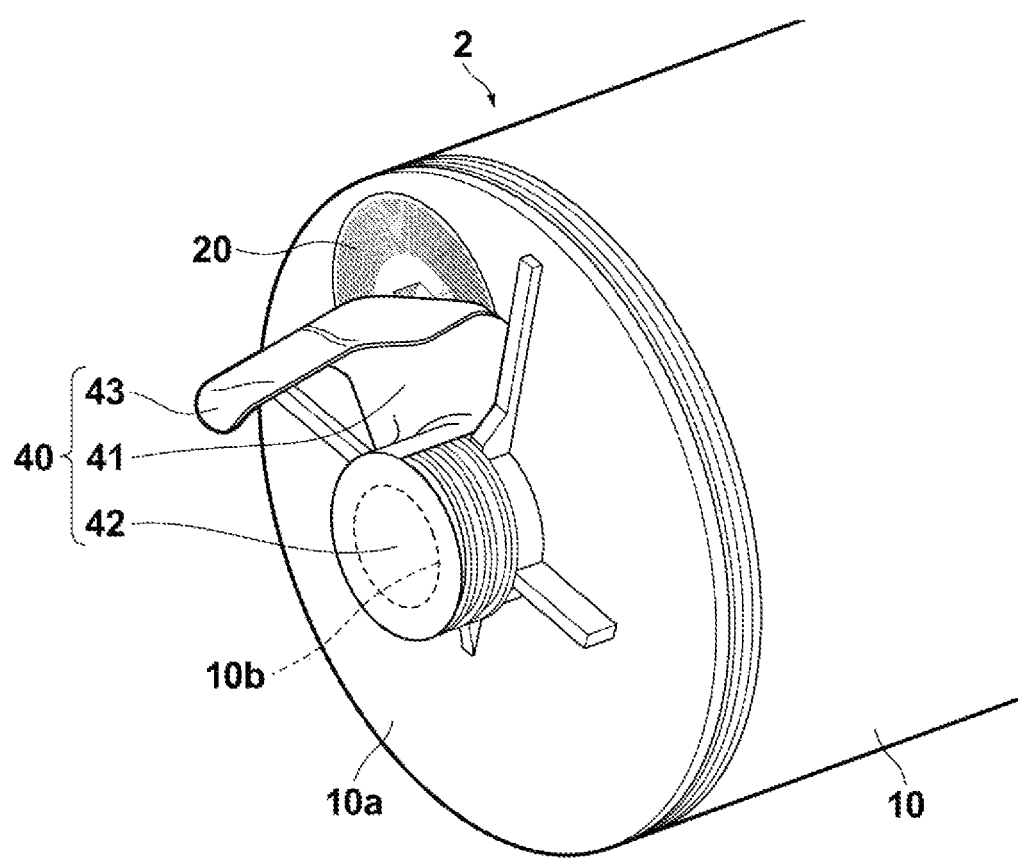
FIG. 3 is a perspective view illustrating an ink bottle used in the screen printing apparatus.

Hereinafter, embodiments of the present invention will be described with reference to the drawings. FIG. 1 is a block diagram illustrating the basic configuration of a communication system which carries out a method of controlling communication according to a first embodiment of the invention. FIG. 2 is a perspective view illustrating a screen printing apparatus 1, which is one example of an apparatus employing the communication system. FIG. 3 is a perspective view illustrating an ink bottle 2 used in the screen printing apparatus 1.

It should be noted that the basic configuration and operation relating to printing by the screen printing apparatus 1 are not directly related to the invention, and the description thereof is omitted.

First, with reference to FIG. 2, structures of parts relating to the communication system of the screen printing apparatus 1 are described. A substantially solid cylindrical ink bottle 2 is inserted in an ink bottle loading port disposed at the center of the screen printing apparatus 1, and a master (master screen) 3, which is rolled in a substantially solid cylindrical shape, is inserted into a plate-making section (details of which is not shown).

As shown in an enlarged view in FIG. 3, the ink bottle 2 includes a hollow cylindrical container body 10 made of a resin, a RFID tag (IC tag) 20 secured on an end face 10a of the container body 10, and a seal 40 adhered on the end face 10a. The seal 40 includes a read blocking area 41, an extended area 42 continuously extending from the read blocking area 41, and a peeling area 43 continuously extending from the read blocking area 41 at the opposite side from the side from which the extended area 42 extends. A projection formed at the center of the end face 10a of the container body 10 includes an opening (not shown), through which an ink filled in the container body 10 is ejected. The seal 40 is adhered on the end face 10a such that the extended area 42 covers the opening and the read blocking area 41 covers the RFID tag 20. The distal end of the peeling area 43 is a non-adhesion area, where no adhesive layer is provided, and thus is not adhered on the end face 10a.

When the ink bottle 2 is loaded in the ink bottle loading port, the user starts peeling with holding the non-adhesion area of the peeling area 43, and the seal 40 is peeled off from the container body 10 in the order of the peeling area 43, the read blocking area 41 and the extended area 42. Thus, the opening is exposed, and use of the ink bottle 2 is enabled. The RFID tag 20 is also exposed, and wireless communication, which will be described later, is enabled.

On the RFID tag 20, identification data about the ink filled in the ink bottle, such as the color, viscosity, and type of the ink (such as whether it is soy ink), are recorded. The RFID tag 20 forms, together with the reader/writer 60 shown in FIG. 1, a communication system that performs wireless communication of data between the RFID tag 20 and the reader/writer 60. Via this wireless communication, the data recorded on the RFID tag 20 is read by the reader/writer 60, and data from the reader/writer 60 is written on the RFID tag 20.

The master 3 also has a RFID tag 30 adhered thereon, which contains identification data of the master 3. The data on the RFID tag 30 is read by a reader/writer provided at the body of the screen printing apparatus 1 via wireless communication. The reference numeral 74 in FIG. 1 denotes a noncontact communication I/F, which is similar to a noncontact communication I/F 64 for the RFID tag 20, which will be described later. The method of controlling communication of the invention is also applicable to this communication system including the RFID tag 30 and the reader/writer. In this case, the same process as that in the method of controlling communication for the communication system including the RFID tag 20 and the reader/writer 60 may be carried out, and detailed description thereof is omitted.

The reader/writer 60 shown in FIG. 1 includes a digital signal processor 61, a transmitter 62 connected to the digital signal processor 61, a receiver 63 connected to the digital signal processor 61, and a noncontact communication I/F (interface) 64 connected to the transmitter 62 and the receiver 63. The digital signal processor 61 is connected to a host computer 50, which controls the entire operation of the screen printing apparatus 1.

The noncontact communication I/F 64 is formed by a matching circuit, an antenna, etc., and carries out wireless communication with the RFID tag 20. As shown in FIG. 2, the noncontact communication I/F 64 is disposed at a position where the noncontact communication I/F 64 is aligned with the RFID tag 20 secured on the ink bottle 2 when the ink bottle 2 is loaded in a predetermined position in the screen printing apparatus 1. Instead of disposing the noncontact communication I/F 64 in such a position, only the antenna forming the noncontact communication I/F 64 may be disposed in that position.

As the RFID tag 20, the transmitter 62 and the receiver 63, those formed by known means are applicable. The known means are described in detail in Japanese Unexamined Patent Publication No. 2005-260468, for example.

The above-described communication system shown in FIG. 1 carries out communication according to the ISO 15693-2, as one example, and the reader/writer 60 is capable of transmitting a command to the RFID tag 20 using, for example, ASK (amplitude shift keying), which carries out direct-load modulation of a carrier with a frequency of 13.56 MHz. The modulation factor in this case is set to 10% or 100%. On the other hand, the RFID tag 20 is adapted such that, when the RFID tag 20 transmits an answer signal to the reader/writer 60, the RFID tag 20 selectively applies one of FM modulation using a dual subcarrier and AM modulation using a single subcarrier based on an instruction from the reader/writer 60.

The command is formed, for example, by an SOF indicating the stat of command, a selection of subcarrier applied by the RFID tag 20, a selection of transmission rate, a flag indicating settings of an extension flag, etc., a command indicating a specific instruction, such as to reload data on the 10th page of the RFID tag 20, a CRC (cyclic redundancy check) byte, and an EOF indicating the end of the command.

Figure 13:
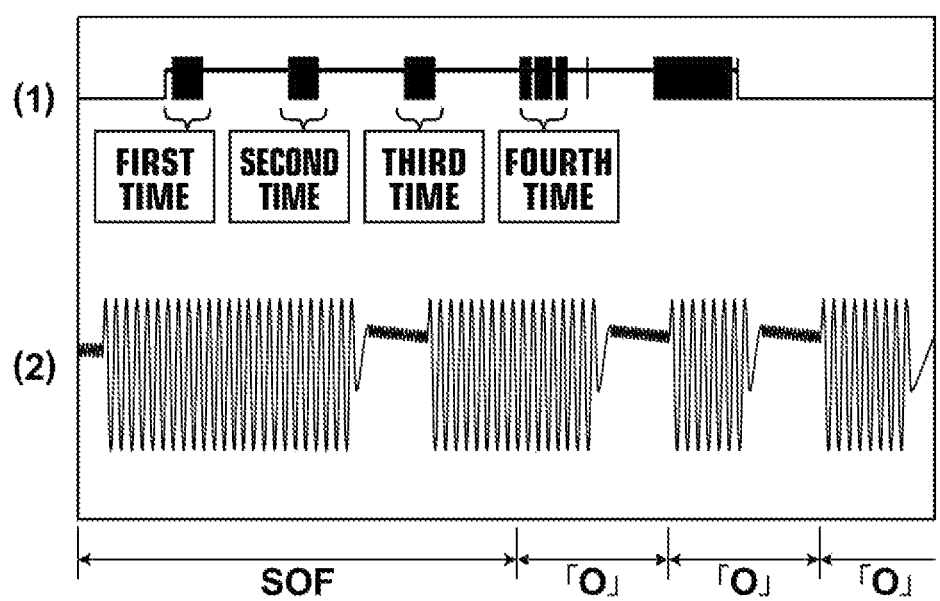
FIG. 13 is a graph showing waveforms of the subcarrier when the method of controlling communication according to the invention is applied.

Now, the two modulation methods applied by the RFID tag 20 are described in detail with reference to FIG. 4. When the RFID tag 20 transmits data to the reader/writer 60 using the FM modulation in response to the instruction from the reader/writer 60, a dual subcarrier shown at "1" in FIG. 4 is outputted. It should be noted that the subcarrier which is actually outputted is sinusoidal, as shown in FIG. 13, which will be described later, for example. However, the subcarriers shown at "1" to "4" in FIG. 4 are shown in pulse waveforms for clarity of explanation.

In the FM modulation, a combination of eight subcarrier pulses with a frequency of 423.75 kHz and nine subcarrier pulses with a frequency of 484.28 kHz is used to represent one bit. That is, when these subcarriers are sent in this order, they represent "0", and when these subcarriers are sent in reverse order, they represent "1". The example shown at "1" in FIG. 4 represents "1", "0", "1", "0".

Further, when the RFID tag 20 transmits data to the reader/writer 60 using the AM modulation in response to the instruction from the reader/writer 60, a single subcarrier shown at "2" in FIG. 4 is outputted. In the AM modulation, a combination of a state when a pulsed subcarrier with a constant frequency rises in a predetermined period and a state when the pulsed subcarrier does not rise in the predetermined period is used to represent one bit. That is, when these states are set in this order, they represent "0", and when these states are set in reverse order, they represent "1". The example shown at "2" in FIG. 4 represents "1", "0", "1", "0".

The information sent from the reader/writer 60 to the RFID tag 20 is converted into a radio wave by applying the above-described ASK and is outputted from the noncontact communication I/F 64. The radio wave carrying the information is received by the RFID tag 20, and the RFID tag 20 carries out wireless transmission of an answer signal relating to the information to the reader/writer 60. At this time, the RFID tag 20 is adapted to send the signal to the reader/writer 60 using the FM modulation or the AM modulation, based on the instruction from the reader/writer 60, as described above.

Examples of waveforms of the subcarriers which are used when the RFID tag 20 carries out transmission using the FM modulation and the AM modulation are shown at "1" and "2" in FIG. 4, respectively. The subcarriers shown in these examples include no disturbed part, and the reader/writer 60 can normally decode these answer signals and correctly read the information sent from the RFID tag 20.

However, as shown at "3" and "4" in FIG. 4, the subcarrier of the answer signal sent from the RFID tag 20 may include a disturbed part. The example shown at "3" in FIG. 4 includes a part, indicated by the ellipse in the drawing, where the cycle of the dual subcarrier is shorter or longer than a predetermined value. As described above, such a failure tends to occur when the FM modulation is used and the RFID tag 20 is positioned relatively near to the reader/writer 60. On the other hand, the example shown at "4" in FIG. 4 includes a part, indicated by the ellipse in the drawing, where the amplitude of the single subcarrier is smaller than a predetermined value. As described above, such a failure tends to occur when the AM modulation is used and the RFID tag 20 is positioned relatively far from the reader/writer 60.

Now, the feature of the invention which allows correct reading of the information sent from the RFID tag 20 even when the above-described failure occurs is described. Prior to describing the process of the invention, a conventional method of controlling communication is described with reference to FIG. 5. It is assumed here that the conventional process shown FIG. 5 is also carried out in the communication system having the basic configuration shown in FIG. 1, for ease of understanding.

In the process shown in FIG. 5, when the process starts, the digital signal processor 61 shown in FIG. 1 receives a command from the host computer 50 (step S1), and transmits the command to the RFID tag 20 (step S2). As described previously, this transmission is carried out with always using the ASK. Further, since one of the FM modulation and the AM modulation is selected when the RFID tag 20 sends back the answer, it is assumed in this example that the FM modulation is selected. In this case, the above command contains an instruction to carry out the transmission (answering) from the RFID tag 20 to the reader/writer 60 with using the FM modulation.

When the RFID tag 20 has received this command, the RFID tag 20 transmits the answer signal to the reader/writer 60 using the FM modulation according to the instruction of the command. Then, the digital signal processor 61 determines whether or not the sent-back data has been successfully received (step S3). If the data has been successfully received, then, the digital signal processor 61 determines whether or not the data is decodable (step S4). If the entire data is decodable, then, the digital signal processor 61 decodes the data and sends the decoded data to the host computer 50 (step S5), and the process ends.

In contrast, if it is determined in step S3 that the data sent back from the RFID tag 20 has not been received successfully, the process returns to step S2, and the determination in step S3 is repeated. If it is still determined that the data has not been received successfully after this operation has been repeated five times, the digital signal processor 61 sends a signal indicating a reading error to the host computer 50 (step S6), and the process ends. In this case, the host computer 50 causes the operation panel of the screen printing apparatus 1 to output an indication of the fact, such as a message "Unsuccessful identification of ink information", to prompt the user to take action on the failure.

Further, if it is determined in step S4 that not the entire data sent from the RFID tag 20 is decodable and the data includes an undecodable part, the process returns to step S2, and the determinations in steps S3 and S4 are repeated. If it is still determined that the data is undecodable after these operations have been repeated five times, the digital signal processor 61 sends a signal indicating a reading error to the host computer 50 (step S6), and the process ends. In this case, the host computer 50 causes the operation panel of the screen printing apparatus 1 to output an indication of the fact, such as a message "Unsuccessful identification of ink information", to prompt the user to take action on the failure.

Next, the process of the invention carried out by the digital signal processor 61 in this embodiment is described with reference to FIG. 6, which illustrates the flow of the process. The operations in steps S1 to S6 shown in FIG. 6 are basically the same as the operations in steps S1 to S6 shown in FIG. 5, except that the operation in step S4 is slightly different. Namely, in this embodiment, if it is determined in step S4 that the data from the RFID tag 20 includes an undecodable part, the process returns to step S2, and the determinations in steps S3 and S4 are repeated. Then, if it is still determined that the data includes an undecodable part after these operations have been repeated three times, the process proceeds to step S11.

In step S11, the digital signal processor 61 sends to the RFID tag 20 a command to the effect that the modulation method used in transmission by the RFID tag 20 is to be set to the AM modulation using a single subcarrier, in place of the FM modulation used so far. When the RFID tag 20 has received this command, the RFID tag 20 sends to the reader/writer 60 an answer signal in response to the command using the AM modulation specified by the command, and the digital signal processor 61 determines whether or not the data transmitted with using the AM modulation has been successfully received (step S12). If the data has been successfully received, then, the digital signal processor 61 determines whether or not the data is decodable (step S13). If the entire data is decodable, then, the digital signal processor 61 decodes the data and sends the decoded data to the host computer 50 (step S5), and the process ends.

In contrast, if it is determined in step S12 that the data sent back from the RFID tag 20 has not been received successfully, the process returns to step S11, and the determination in step S12 is repeated. If it is still determined that the data has not been received successfully after this operation has been repeated three times, the digital signal processor 61 sends a signal indicating a reading error to the host computer 50 (step S14), and the process ends. In this case, the host computer 50 causes the operation panel of the screen printing apparatus 1 to output an indication of the fact, such as a message "Unsuccessful identification of ink information", to prompt the user to take action on the failure.

Further, if it is determined in step S13 that the data from the RFID tag 20 includes an undecodable part, the process returns to step S11, and the determinations in steps S12 and S13 are repeated. If it is still determined that the data includes an undecodable part after these operations have been repeated three times, the digital signal processor 61 sends a signal indicating a reading error to the host computer 50 (step S14), and the process ends. In this case, the host computer 50 causes the operation panel of the screen printing apparatus 1 to output an indication of the fact, such as a message "Unsuccessful identification of ink information", to prompt the user to take action on the failure.

As described above, in this embodiment, if the reader/writer 60 fails to decode a part of the answer signal from the RFID tag 20 transmitted with using the FM modulation (this is often the case during short-distance communication), the communication method is switched to the AM modulation, which can achieve stable short-distance communication, to carry out the communication again, thereby minimizing occurrence of reading error.

FIG. 13 shows actual waveforms of the subcarrier when the modulation method is switched as described above. In FIG. 13, the waveforms shown with the indications of "1st time", "2nd time" and "3rd time" above schematically show states of the modulation using the dual subcarrier when the negative determination in step S4 of FIG. 6 is repeated three times. The waveform with the indication of "4th time" schematically shows a state of the modulation using the single subcarrier when the negative determination in step S4 of FIG. 6 has been made for the third time and the modulation using the single subcarrier is newly applied.

The waveform of the single subcarrier when the modulation using the single subcarrier is applied is shown at "2". In this example, the leading part includes a part with no pulse+ 24 pulses+no pulse+8 pulses, which is the SOF indicating the start of command, as defined in the ISO 15693-2. Then, three parts including 8 pulses+no pulse follow, which represent the data "0", as described previously with reference to "2" in FIG. 4.

In contrast to this embodiment, when the RFID tag 20 first carries out transmission with applying the AM modulation, and the reader/writer 60 fails to decode the answer signal from the RFID tag 20 (this is often the case during long-distance communication), the communication method at the RFID tag 20 may be switched to the FM modulation, which achieves stable long-distance communication, to carry out the transmission again. This also minimizes occurrence of reading error.

Figure 7B:
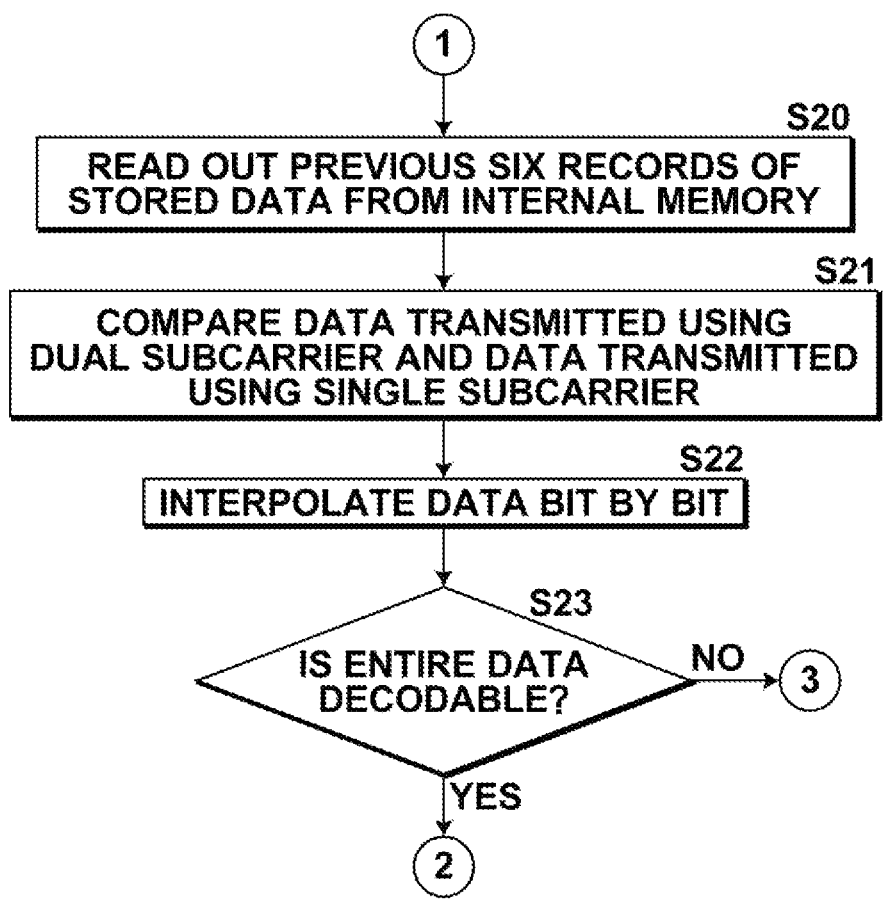
FIG. 7B is a flow chart illustrating the flow of the process in the method of controlling communication according to the second embodiment of the invention.

Next, the method of controlling communication according to a second embodiment of the invention is described with reference to FIGS. 7A and 7B, which illustrate the flow of the process. The operations in steps S1 to S6 and steps S11 to S13 shown in FIGS. 7A and 7B are basically the same as the operations in steps S1 to S6 and steps S11 to S13 shown in FIG. 6, except that the operation in step S13 is slightly different, etc. Namely, in this embodiment, if the determination in step S13 that the data from the RFID tag 20 is undecodable is repeated three times, the process proceeds to step S20. In addition, this embodiment includes steps S25 and S26 of storing the data received from the RFID tag 20 in an internal memory of the reader/writer 60, between step S3 and step S4 and between step S12 and step S13, respectively.

In step S20, the digital signal processor 61 reads out, from the internal memory, data of the answer signal which is obtained by applying the FM modulation using a dual subcarrier and data of the answer signal which is obtained by applying the AM modulation using a single subcarrier. Then, the digital signal processor 61 compares these data with each other in step S21. Then, in step S22, the digital signal processor 61 extracts data which is considered to be normal from these data, and carries out interpolation between these data bit by bit. Then, in step S23, the digital signal processor 61 determines whether or not the entire interpolated data is decodable. If it is determined that the entire interpolated data is decodable, then, the digital signal processor 61 decodes the data and sends the decoded data to the host computer 50 (step S5), and the process ends.

In contrast, if it is determined in step S23 that the interpolated data includes an undecodable part, the digital signal processor 61 sends a signal indicating a reading error to the host computer 50 (step S14), and the process ends. In this case, the host computer 50 causes the operation panel of the screen printing apparatus 1 to output an indication of the fact, such as a message "Unsuccessful identification of ink information", to prompt the user to take action on the failure.

It should be noted that FIG. 4 described above facilitates understanding of the data generation using interpolation. Namely, in the example shown at "3", the first bit of the received data on the dual subcarrier is undecodable. In the example shown at "4", the third bit of the received data on the single subcarrier is undecodable. Therefore, the above first bit is interpolated with the received data on the single subcarrier and the above third bit is interpolated with the received data on the dual subcarrier, and then, the interpolated data is decoded to finally provide data without a missing part, as shown at "5" in FIG. 4.

It should be noted that the above-described interpolation may be carried out in combination, in particular, with the process shown in FIG. 6, or may be carried out independently without being combined with the process shown in FIG. 6.

Further, although the determination as to whether or not the undecoded signal which is transmitted with using one of the AM modulation and the FM modulation is decodable is made, an undecodable part of the signal is interpolated with the undecoded signal which is transmitted with using the other of the AM modulation and the FM modulation, and then, the interpolated signal is decoded in this embodiment, the interpolation and the decoding may be carried out in reverse order. Namely, an undecodable part of the signal which is transmitted with using one of the AM modulation and the FM modulation and decoded may be interpolated with the corresponding decoded part of the signal which is transmitted with using the other of the AM modulation and the FM modulation.

Figure 8:
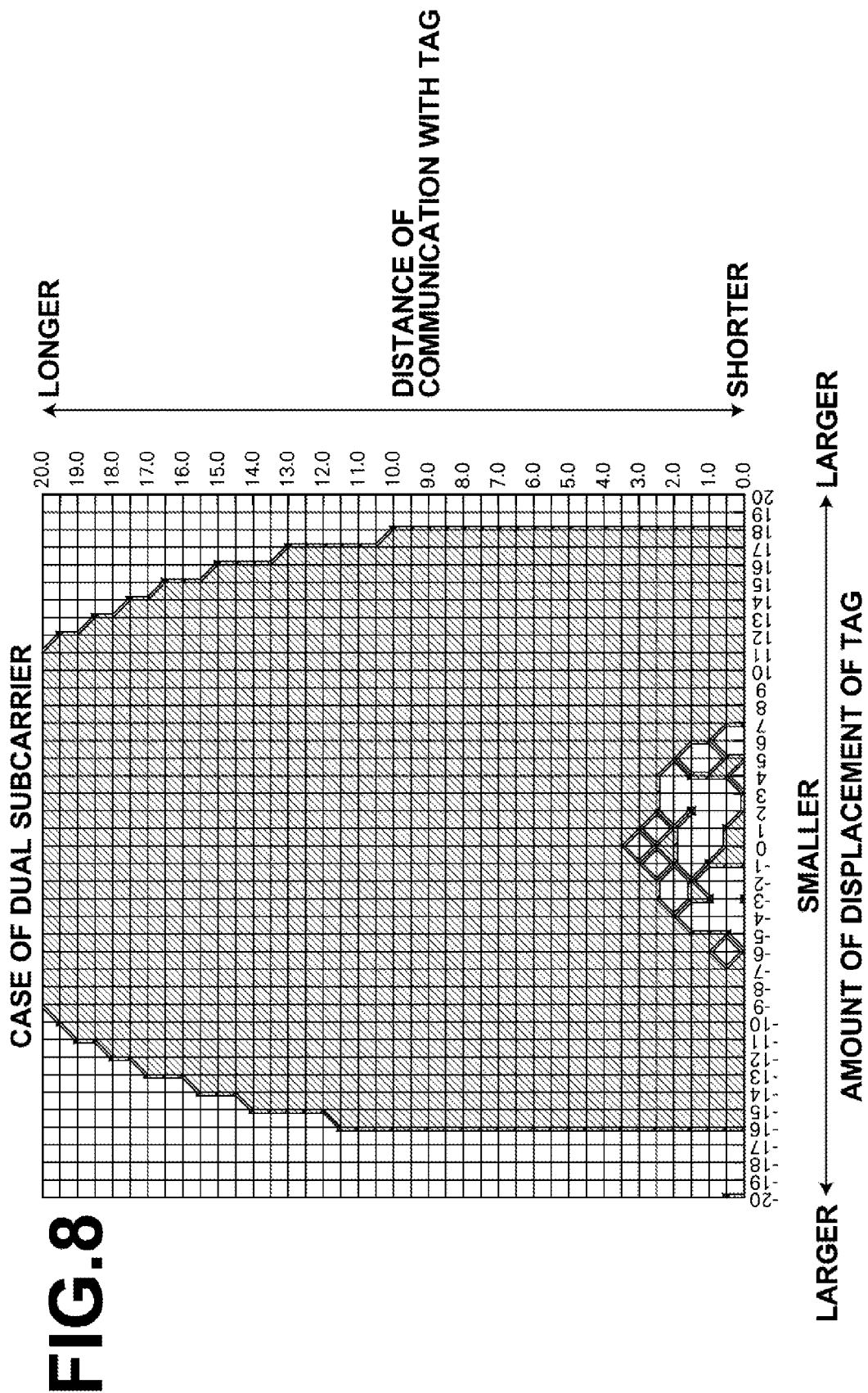
FIG. 8 is a graph showing occurrence of data reading error when only a dual subcarrier was used.
Figure 9:
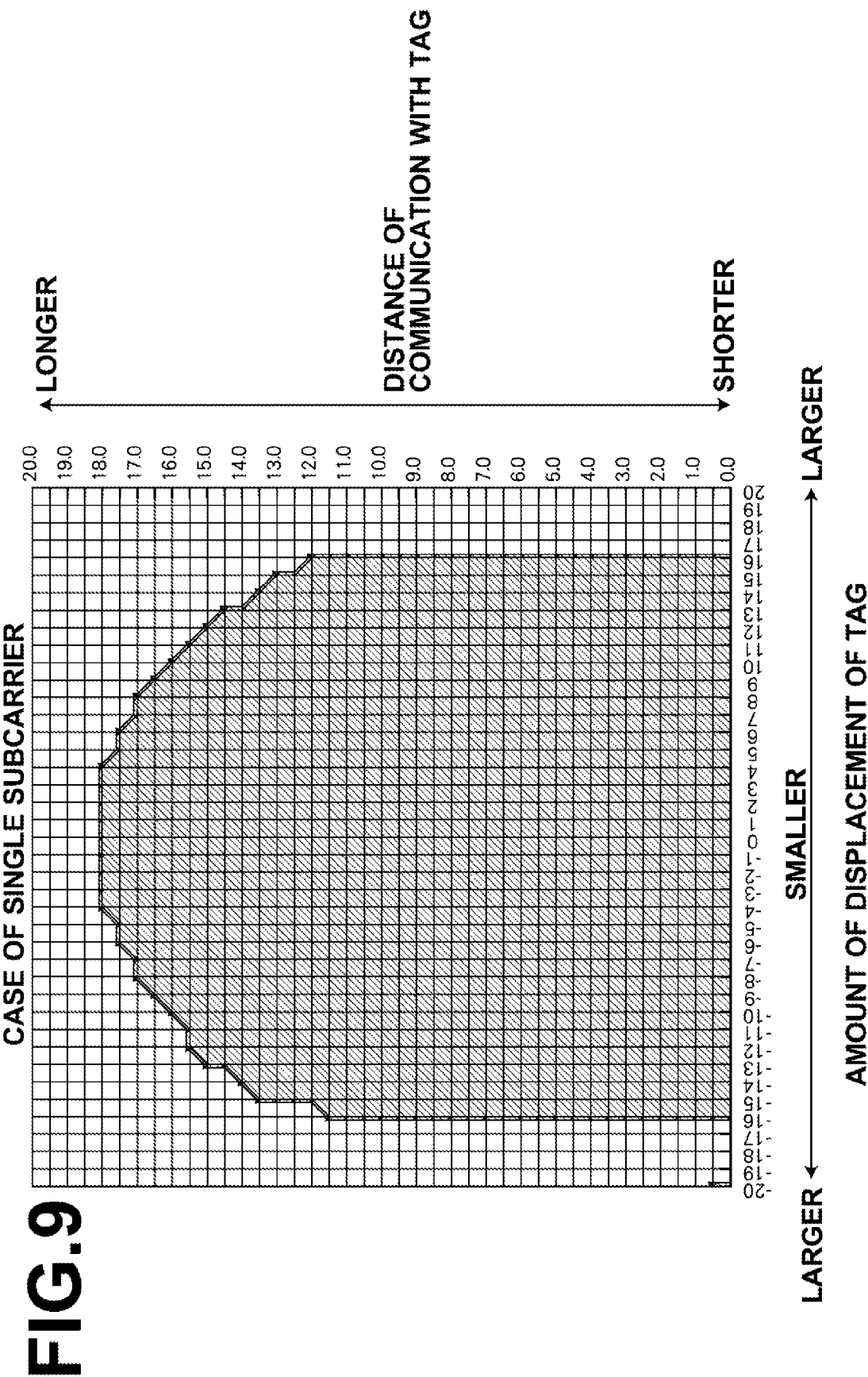
FIG. 9 is a graph showing occurrence of data reading error when only a single subcarrier was used.
Figure 10:
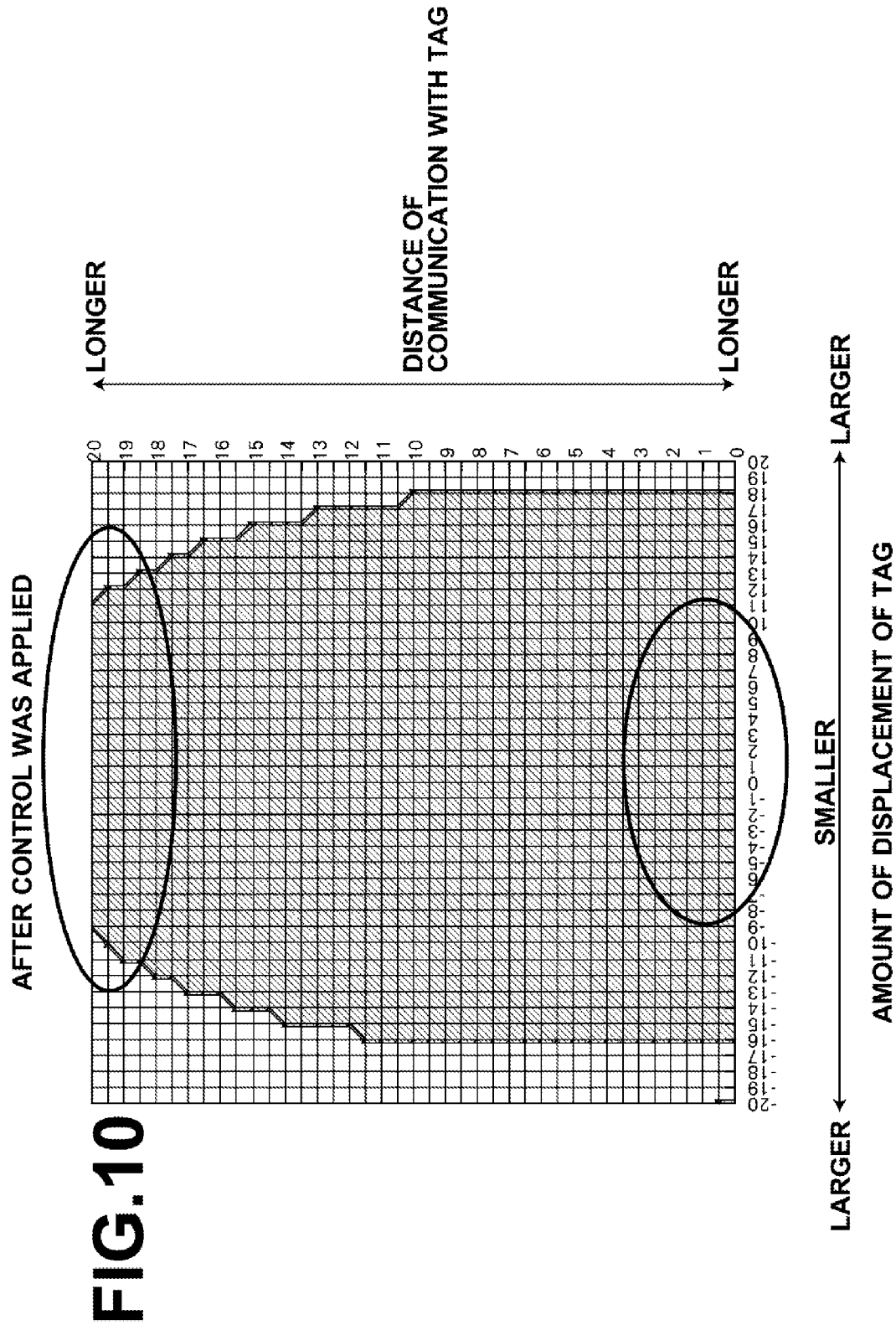
FIG. 10 is a graph showing occurrence of data reading error when the method of controlling communication according to the invention was applied.

Next, results of actual measurement of the effect according to the invention are described with reference to FIGS. 8 to 10. FIGS. 8 to 10 show, in the form of a graph, whether communication was successful or unsuccessful in each case of communication carried out with different amounts of displacement and distances, when the abscissa axis represents the amount of displacement of the transmission/reception axis (a wavefront normal of the transmission wave) of the RFID tag 20 relative to the transmission/reception axis of the reader/writer 60 in the configuration shown in FIG. 1, and the ordinate axis represents the distance (communication distance) between the reader/writer 60 and the RFID tag 20. The unit of the numerical values along the abscissa axis and ordinate axis is "mm", and the symbols along the abscissa axis indicate directions of displacement Areas when the communication was successful are provided with hatching, and areas where the communication was unsuccessful are not provided with hatching.

FIGS. 8, 9 and 10 show the results of measurement in the case when only the FM modulation using a dual subcarrier was applied, in the case when only the AM modulation using a single subcarrier was applied, and in the case where the process shown in FIG. 6 was applied, respectively. It can be seen from FIG. 8 that communication was successful even when the communication distance was relatively long; however, communication was often unsuccessful when the communication distance was relatively short and the amount of displacement was small. In contrast, it can be seen from FIG. 9 that communication was successful when the communication distance was relatively short and the amount of displacement was small; however, communication was unsuccessful when the communication distance was long.

In the case shown in FIG. 10 when the present invention was applied, normal communication was ensured in a wide area with preventing the unsuccessful communication in the cases shown in FIGS. 8 and 9.

Next, results of checking the effect according to the invention from a different point of view are described with reference to FIGS. 11 and 12. The numerical values in FIGS. 11 and 12 indicate numbers of times of successful communication when the communication was carried out ten times with different amounts of displacement and distances, when the abscissa axis represents the amount of displacement of the transmission/reception axis (a wavefront normal of the transmission wave) of the RFID tag 20 relative to the transmission/reception axis of the reader/writer 60 in the configuration shown in FIG. 1, and the ordinate axis represents the distance (communication distance) between the reader/writer 60 and the RFID tag 20. The cases when the number of times of successful communication was not more than six times are indicated by providing the numerical values thereof with half-tone dots. The unit of the numerical values along the abscissa axis and ordinate axis is "mm", and the distances are shown with an increment of 0.1 mm; however, numbers after the decimal point are truncated with respect to the entire range along the abscissa axis and the upper-half range along the ordinate axis.

Figure 11:
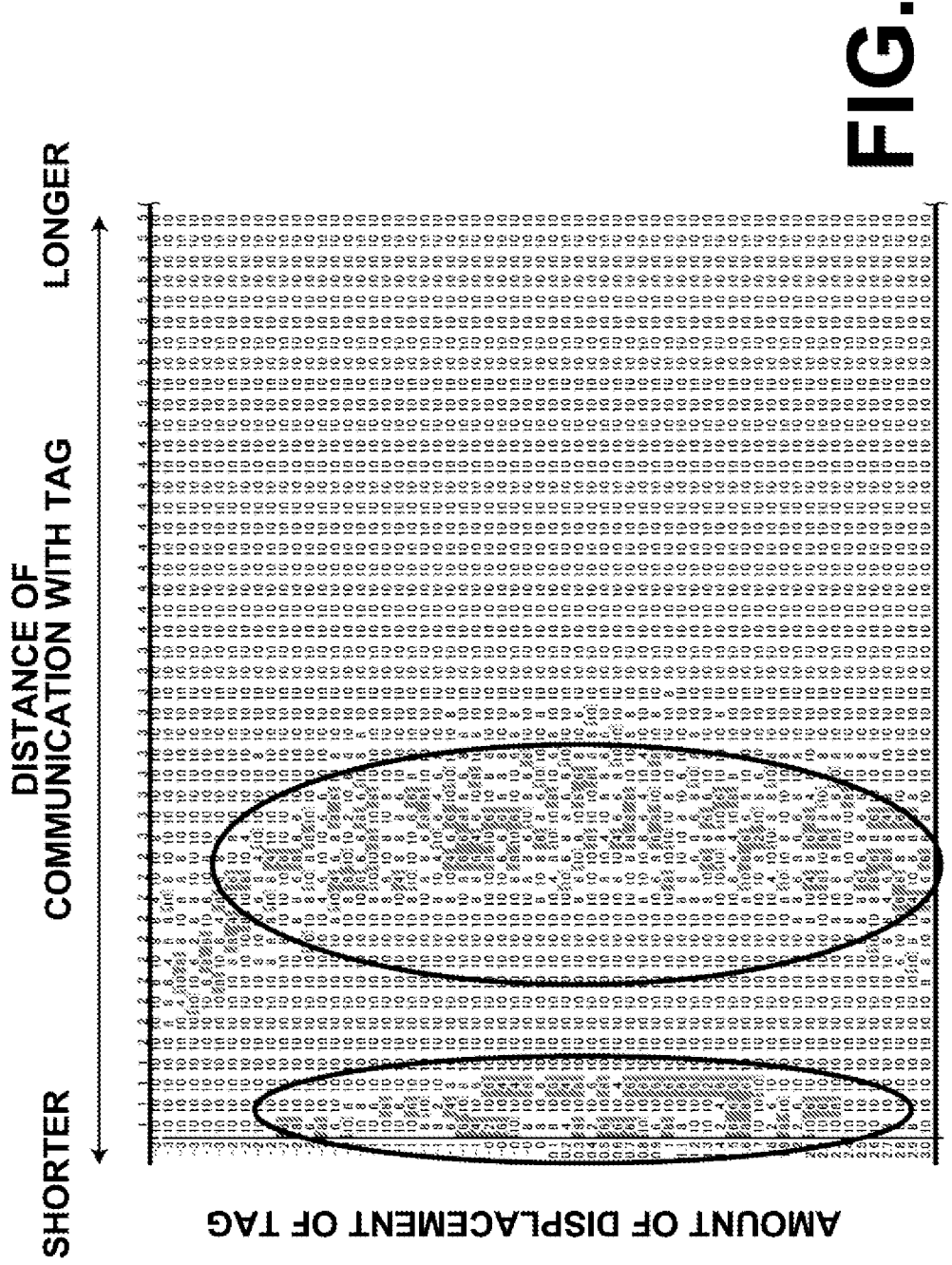
FIG. 11 is a diagram showing whether communication was successful or unsuccessful in each case in prior art.
Figure 12:
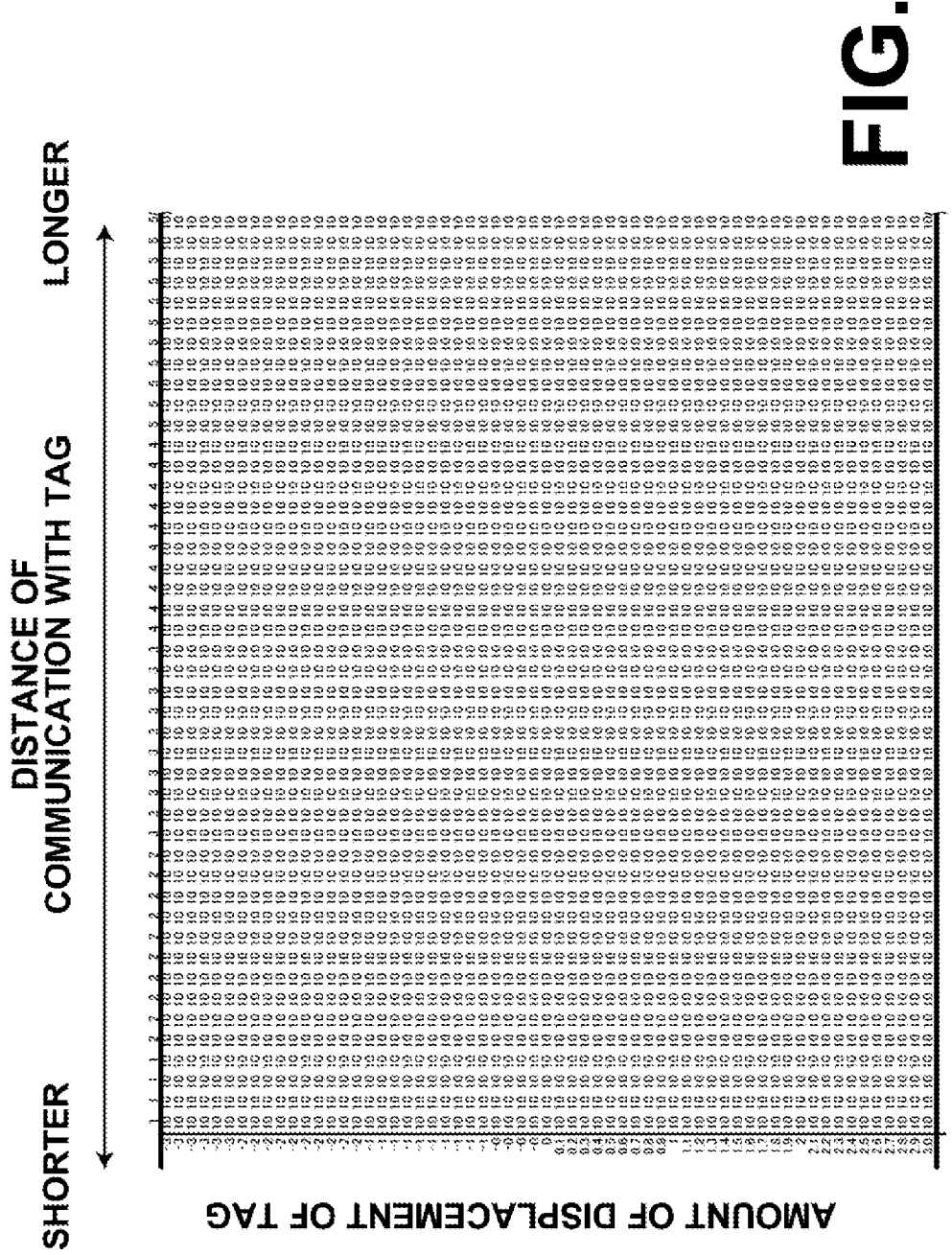
FIG. 12 is a diagram showing whether communication was successful or unsuccessful in each case when the method of controlling communication according to the invention was applied.

FIGS. 11 and 12 show results of the measurement in the case when only the FM modulation using a dual subcarrier was used and in the case where the process shown in FIG. 6 was applied. It can be seen from FIG. 11 that, in this case, the number of times of successful communication was small when the communication distance was relatively short and the amount of displacement was small. In contrast, in the case shown in FIG. 12, successful communication was achieved ten times in all the areas.

Next, the method of controlling communication according to a third embodiment of the invention is described with reference to FIG. 14, which illustrates the flow of the process. The operations shown in FIG. 14 are also carried out by the digital signal processor 61 in the communication system having the basic configuration shown in FIG. 1.

In this embodiment, when the process starts, the digital signal processor 61 receives a test communication command from the host computer 50 (step S31), and transmits the command to the RFID tag 20 (step S32). This transmission is also carried out using the above-described ASK. When the RFID tag 20 has received this command, the RFID tag 20 carries out test transmission of a predetermined answer signal to the reader/writer 60. The above command contains an instruction to carry out the test transmission by the RFID tag 20 with using, for example, the FM modulation using a dual subcarrier, and the RFID tag 20 carries out the transmission according to the command. It should be noted that the test transmission may be carried out using the AM modulation using a single subcarrier.

Then, the digital signal processor 61 checks a minimum amplitude $A_{min}$ of the answer signal (step S33), and compares the minimum amplitude $A_{min}$ with a predetermined amplitude threshold $A_{ref}$ (step S34). If the result of the comparison is $A_{min}<A_{ref}$, i.e., if it is determined that the minimum amplitude $A_{min}$ is smaller than the amplitude threshold $A_{ref}$, then, the digital signal processor 61 sends a command, which instructs to send back required information, to the RFID tag 20 (step S35). It should be noted that this command contains an instruction to carry out the transmission from the RFID tag 20 to the reader/writer 60 with using the FM modulation using a dual subcarrier.

When the RFID tag 20 has received this command, the RFID tag 20 sends to the reader/writer 60 an answer signal with using the FM modulation according to the instruction of the command. Then, the digital signal processor 61 determines whether or not the sent-back data has been successfully received (step S36). If the data has been successfully received, then, the digital signal processor 61 determines whether or not the data is decodable (step S37). If the entire data is decodable, then, the digital signal processor 61 decodes the data and sends the decoded data to the host computer 50 (step S38), and the process ends.

In contrast, if it is determined in step S36 that the data sent back from the RFID tag 20 has not been received successfully by the reader/writer 60 or if it is determined in step S37 that the data includes an undecodable part, then, the digital signal processor 61 sends a signal indicating a reading error to the host computer 50 (step S39), and the process ends. In this case, the host computer 50 causes the operation panel of the screen printing apparatus 1 to output an indication of the fact, such as a message "Unsuccessful identification of ink information", to prompt the user to take action on the failure.

In contrast, if it is determined in step S34 that $A_{min} \geq A_{ref}$, i.e., the minimum amplitude $A_{min}$ is equal to or larger than the amplitude threshold $A_{ref}$, then, the digital signal processor 61 sends to the RFID tag 20 a command instructing to send back required information in step S45. It should be noted that this command contains an instruction to carry out the transmission from the RFID tag 20 to the reader/writer 60 with using the AM modulation using a single subcarrier.

When the RFID tag 20 has received this command, the RFID tag 20 sends to the reader/writer 60 an answer signal with using the AM modulation according to the instruction of the command. Then, the digital signal processor 61 determines whether or not the sent-back data has been successfully received (step S46). If the data has been successfully received, then, the digital signal processor 61 determines whether or not the data is decodable (step S47). If the entire data is decodable, then, the digital signal processor 61 decodes the data and sends the decoded data to the host computer 50 (step S48), and the process ends.

In contrast, if it is determined in step S46 that the data sent back from the RFID tag 20 has not been received successfully or if it is determined in step S47 that the data includes an undecodable part, then, the digital signal processor 61 sends a signal indicating a reading error to the host computer 50 (step S49), and the process ends. In this case, the host computer 50 causes the operation panel of the screen printing apparatus 1 to output an indication of the fact, such as a message "Unsuccessful identification of ink information", to prompt the user to take action on the failure.

It is believed that the case when the minimum amplitude $A_{min}$ is smaller than the amplitude threshold $A_{ref}(A_{min}<A_{ref})$, as described above, occurs when the RFID tag 20 is, in general, positioned relatively far from the reader/writer 60, and the case when the minimum amplitude $A_{min}$ is equal to or larger than the amplitude threshold $A_{ref}(A_{min} \geq A_{ref})$ occurs when the RFID tag 20 is, in general, positioned relatively near to the reader/writer 60. Therefore, by applying the FM modulation, which achieves stable long-distance communication, to transmission from the RFID tag 20 to the reader/writer 60 in the former case, and by applying the AM modulation, which achieves stable short-distance communication, to the transmission from the RFID tag 20 to the reader/writer 60 in the latter case, as in this embodiment, occurrence of reading error is minimized.

Figure 15A:
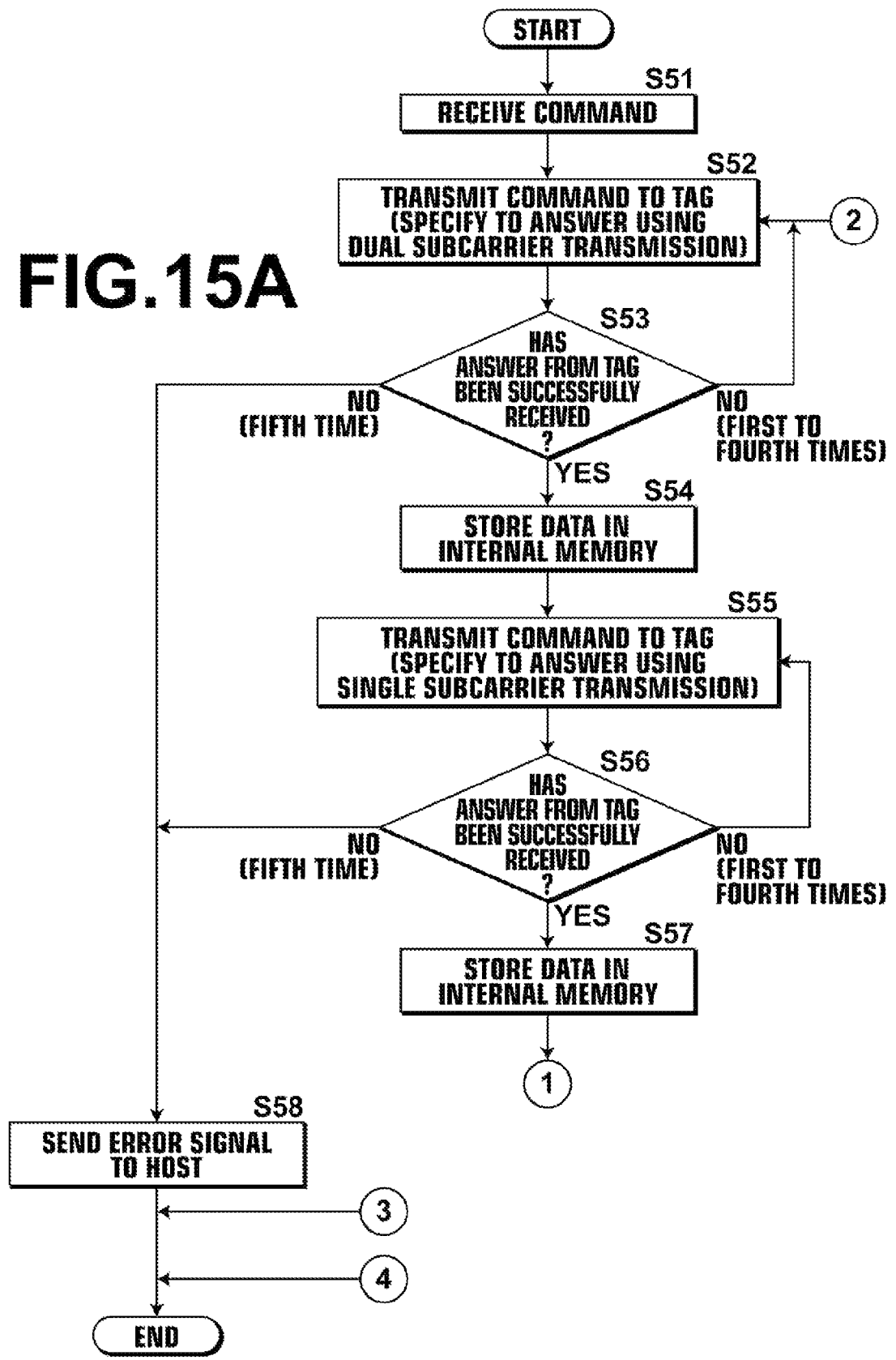
FIG. 15A is a flow chart illustrating the flow of a process in the method of controlling communication according to a fourth embodiment of the invention.

Next, the method of controlling communication according to a fourth embodiment of the invention is described with reference to FIGS. 15A and 15B, which illustrate the flow of the process. The process shown in FIGS. 15A and 15B is also carried out by the digital signal processor 61 in the communication system having the basic configuration shown in FIG. 1.

In this embodiment, when the process starts, the digital signal processor 61 receives a command from the host computer 50 (step S51), and transmits the command to the RFID tag 20 (step S52). This transmission is also carried out using the above-described ASK. This command contains an instruction to carry out the transmission from the RFID tag 20 to the reader/writer 60 with using the FM modulation. When the RFID tag 20 has received this command, the RFID tag 20 transmits a predetermined answer signal to the reader/writer

60. The RFID tag 20 carries out this transmission with using the FM modulation using a dual subcarrier according to the command.

When the RFID tag 20 has received this command, the RFID tag 20 sends to the reader/writer 60 an answer signal with using the FM modulation according to the instruction, and the digital signal processor 61 determines whether or not the sent-back data has been successfully received (step S53). If it is determined that the data has not been received successfully, the process returns to step S52, and the transmission of command and the determination in step S53 are repeated. If it is still determined that the data has not been received successfully after these operations have been repeated five times, the digital signal processor 61 sends a signal indicating a reading error to the host computer 50 (step S58), and the process ends. In this case, the host computer 50 causes the operation panel of the screen printing apparatus 1 to output an indication of the fact, such as a message "Unsuccessful identification of ink information", to prompt the user to take action on the failure.

If it is determined in step S53 that the data has been successfully received, then, the digital signal processor 61 causes the successfully received data to be stored in the internal memory in step S54. Then, in step S55, the digital signal processor 61 transmits the command again to the RFID tag 20. The command at this time contains an instruction to early out the transmission by the RFID tag 20 with using the AM modulation using a single subcarrier, and the RFID tag 20 carries out the transmission according to the command.

When the RFID tag 20 has received this command, the RFID tag 20 sends to the reader/writer 60 an answer signal with using the AM modulation, and the digital signal processor 61 determines whether or not the sent-back data has been successfully received (step S56). If it is determined that the data has not been received successfully, the process returns to step S55, and the transmission of command and the determination in step S56 are repeated. If it is still determined that the data has not been received successfully after these operations have been repeated five times, the digital signal processor 61 sends a signal indicating a reading error to the host computer 50 (step S58), and the process ends. In this case, the host computer 50 causes the operation panel of the screen printing apparatus 1 to output an indication of the fact, such as a message "Unsuccessful identification of ink information", to prompt the user to take action on the failure.

If it is determined in step S56 that the data has been successfully received, then, the digital signal processor 61 causes the successfully received data to be stored in the internal memory in step S57. Then, in step S59, the digital signal processor 61 reads out the data of the answer signal which is obtained by applying the FM modulation using a dual subcarrier and the data of the answer signal which is obtained by applying the AM modulation using a single subcarrier from the internal memory, and compares these data with each other in step S60.

Then, in step S61, the digital signal processor 61 extracts data which is considered to be normal from these data, and carries out interpolation between these data bit by bit. Then, in step S62, the digital signal processor 61 determines whether or not the entire interpolated data is decodable. If it is determined that the entire interpolated data is decodable, then, the digital signal processor 61 decodes the data and sends the decoded data to the host computer 50 (step S63), and the process ends.

In contrast, if it is determined in step S62 that the interpolated data includes an undecodable part, the process returns to step S52, and the operations in step S52 and the following steps are repeated. If it is still determined that the interpolated data includes an undecodable part after these operations have been repeated three times, the digital signal processor 61 sends a signal indicating a reading error to the host computer 50 (step S64), and the process ends. In this case, the host computer 50 causes the operation panel of the screen printing apparatus 1 to output an indication of the fact, such as a message "Unsuccessful identification of ink information", to prompt the user to take action on the failure.

By carrying out the process as described above, a part undecodable by the reader/writer 60 of the signal transmitted from the RFID tag 20 using one of the FM modulation and the AM modulation and received by the reader/writer 60 is interpolated with the signal transmitted with using the other of the FM modulation and the AM modulation and received by reader/writer 60 to finally provide decoded data with minimized reading error.

Although the decoding is carried out after the interpolation in this embodiment, the interpolation and the decoding may be carried out in reverse order. Namely, an undecoded part of the signal transmitted with using one of the AM modulation and the FM modulation, which has been subjected to decoding, may be interpolated with the corresponding decoded part of the signal which is transmitted with using the other of the AM modulation and the FM modulation.

Further, the above-described interpolation may be carried out in combination, in particular, with the process shown in FIG. 6, or may be carried out independently without being combined with the process shown in FIG. 6.

What is claimed is:

1. A method of controlling communication for use with a communication system including a RFID tag having a function to record information and a function to carry out wireless communication with an external device, and a reader/writer for writing and reading information onto and from the RFID tag via wireless communication, the RFID tag being capable of transmission with using both FM modulation and AM modulation, the method comprising:

when information is transmitted from the RFID tag to the reader/writer, carrying out both of transmission using the FM modulation at the RFID tag and transmission using the AM modulation at the RFID tag; and interpolating a part undecodable by the reader/writer of a signal transmitted with using one of the FM modulation and the AM modulation and received by the reader/writer with a signal transmitted with using the other of the FM modulation and the AM modulation and received by the reader/writer, and then, decoding the signals.

2. A method of controlling communication for use with a communication system including a RFID tag having a function to record information and a function to carry out wireless communication with an external device, and a reader/writer for writing and reading information onto and from the RFID tag via wireless communication, the RFID tag being capable of transmission with using both FM modulation and AM modulation, the method comprising:

when information is transmitted from the RFID tag to the reader/writer, carrying out both of transmission using the FM modulation at the RFID tag and transmission using the AM modulation at the RFID tag; and interpolating a part undecodable by the reader/writer of a signal transmitted with using one of the FM modulation and the AM modulation and received and decoded by the reader/writer with a corresponding part of a signal transmitted with using the other of the FM modulation and the AM modulation and received and decoded by the reader/writer.

* * * * *